(Model.)

T. O. MEMERY.
Sewing Machine Shuttle.

No. 236,238. Patented Jan. 4, 1881.

WITNESSES:
A. Schehl.
C. Sedgwick

INVENTOR:
T. O. Memery
BY Munn & Co.
ATTORNEYS.

UNITED STATES PATENT OFFICE.

TOM OWEN MEMERY, OF KEY WEST, FLORIDA.

SEWING-MACHINE SHUTTLE.

SPECIFICATION forming part of Letters Patent No. 236,238, dated January 4, 1881.

Application filed March 22, 1880. (Model.)

*To all whom it may concern:*

Be it known that I, TOM O. MEMERY, of Key West, in the county of Monroe and State of Florida, have invented a new and useful Improvement in Sewing-Machine Shuttles, of which the following is a specification.

The object of my invention is to permit the use of ordinary spools in sewing-machine shuttles and obviate the necessity of winding bobbins specially for shuttles.

My invention consists in a shuttle provided with a hinged spindle for receiving the spool and a friction nut and screw, which also sustains the moving end of the spindle when in position for use, such construction permitting the ready application and removal of the spool.

Figure 1:
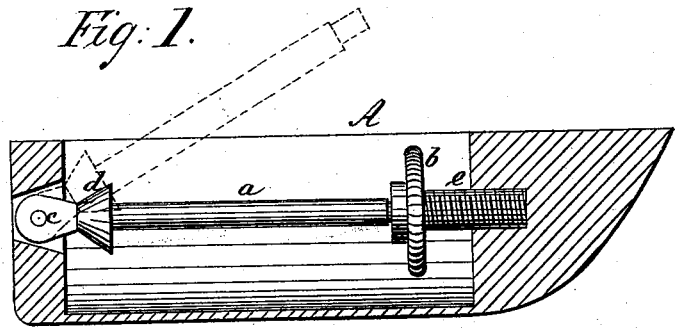
Figure 2:
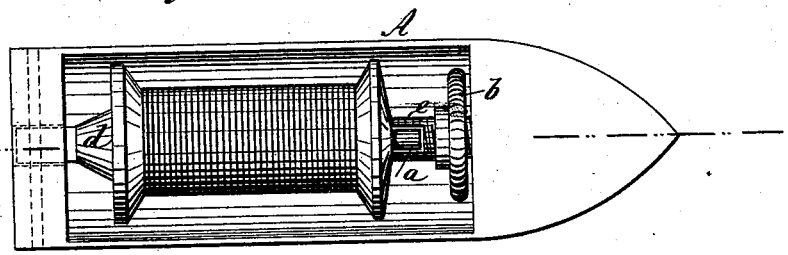

In the accompanying drawings, forming part of this specification, Figure 1 is a longitudinal section of a shuttle fitted in accordance with my invention, and Fig. 2 is a plan view of the same.

Similar letters of reference indicate corresponding parts.

A is the shuttle-body; $a$, the spindle, and $b$ the friction-nut. The spindle $a$ is attached in the heel of the shuttle by a cross-pin, $c$, which passes through the shuttle-body and the end of the spindle, thereby forming a hinge-joint, which permits the spindle to swing. The spindle is fitted, near the jointed end, with a collar, $d$, and terminates near the forward end of the shuttle-body cavity. In the toe of the shuttle-body is fitted a screw, $e$, which projects within the shuttle-body and carries the friction-nut $b$. The end of screw $e$ is notched or recessed to receive the end of spindle $a$, so that when the spindle is turned down in place its end is held by the screw, and the nut $b$ may be screwed forward over the end.

The spool is to be placed on the spindle, as shown in Fig. 2, and the nut $b$ turned to cover the end of the spindle and bear upon the end of the spool to give the required tension. To remove an empty spool the nut $b$ will be screwed back and the spindle raised, as shown in dotted lines in Fig. 1, when the spool may be taken off and another put in place.

By this construction the necessity of having bobbins especially for the shuttle-body is obviated, and the time and labor of winding them saved.

Having thus fully described my invention, I claim as new and desire to secure by Letters Patent—

The combination, with a shuttle-body, of the spindle $a$, hinged thereto, and having the collar $d$, the end-notched bearing-screw $e$, and the friction-nut $b$, substantially as shown and described.

TOM OWEN MEMERY.

Witnesses:
F. W. LESTER,
GEO. N. NOTTAGE.